(12) United States Patent
Tsujimoto et al.

(10) Patent No.: US 7,283,320 B2
(45) Date of Patent: Oct. 16, 2007

(54) MAGNETIC RECORDING MEDIUM INCLUDING SERVO AND DATA BANDS IN THE MAGNETIC LAYER

(75) Inventors: Shinji Tsujimoto, Kanagawa (JP); Kiyomi Ejiri, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 206 days.

(21) Appl. No.: 10/878,552

(22) Filed: Jun. 29, 2004

(65) Prior Publication Data

US 2004/0265644 A1    Dec. 30, 2004

(30) Foreign Application Priority Data

Jun. 30, 2003  (JP) ............................. 2003-188335
May 31, 2004  (JP) ............................. 2004-161651

(51) Int. Cl.
  *G11B 5/68*   (2006.01)
  *G11B 5/58*   (2006.01)
  *G11B 5/584*  (2006.01)

(52) U.S. Cl. ................................ 360/77.08; 360/77.05; 360/77.06; 360/77.11; 360/77.12; 360/78.02; 360/78.14; 360/131; 360/134; 428/842

(58) Field of Classification Search .................... None
See application file for complete search history.

(56) References Cited

U.S. PATENT DOCUMENTS

| | | | |
|---|---|---|---|
| 4,720,754 A * | 1/1988 | Mizoshita et al. ....... 360/77.02 |
| 4,996,609 A | 2/1991 | Joannou | |
| 6,316,077 B1 * | 11/2001 | Doushita et al. ............ 428/141 |
| 6,347,016 B1 | 2/2002 | Ishida et al. | |
| 6,970,312 B2 | 11/2005 | Yip et al. | |
| 2004/0262148 A1 * | 12/2004 | Cheng et al. ............ 204/192.1 |
| 2005/0175863 A1 * | 8/2005 | Ji et al. ....................... 428/829 |
| 2006/0003191 A1 * | 1/2006 | Kuse et al. .............. 428/842.8 |

FOREIGN PATENT DOCUMENTS

| | | |
|---|---|---|
| JP | 58-56228 A | 4/1983 |
| JP | 60-238179 A | 11/1985 |
| JP | 62-95174 A | 5/1987 |
| JP | 63-88080 A | 4/1988 |
| JP | 1-236968 A | 9/1989 |
| JP | 1-46186 B2 | 10/1989 |
| JP | 2-17971 A | 1/1990 |
| JP | 2-174965 A | 7/1990 |
| JP | 2-265672 A | 10/1990 |
| JP | 3-8471 A | 1/1991 |
| JP | 8-30942 A | 2/1996 |

* cited by examiner

*Primary Examiner*—Kevin M. Bernatz
(74) *Attorney, Agent, or Firm*—Sughrue Mion Pllc.

(57) ABSTRACT

A magnetic recording medium having a magnetic layer containing magnetic powder provided on a support is disclosed. The magnetic layer possesses a servo band in which a servo signal for controlling tracking of a magnetic head, and a data band on which a data is recorded. The servo signal is magnetized and recorded on the servo band, having been magnetized in one direction of the track direction thereof, in the direction other than the one direction. The thickness of the magnetic layer ranging from 10 to 180 μm, and variation [standard deviation of Mrt] of the product [Mrt] of the residual magnetism by the thickness of the magnetic field being not more than 30%.

13 Claims, 3 Drawing Sheets

SFD=ΔH/Hc

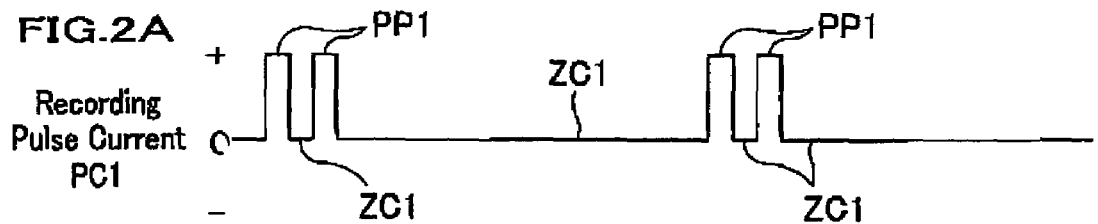
FIG.2A Recording Pulse Current PC1
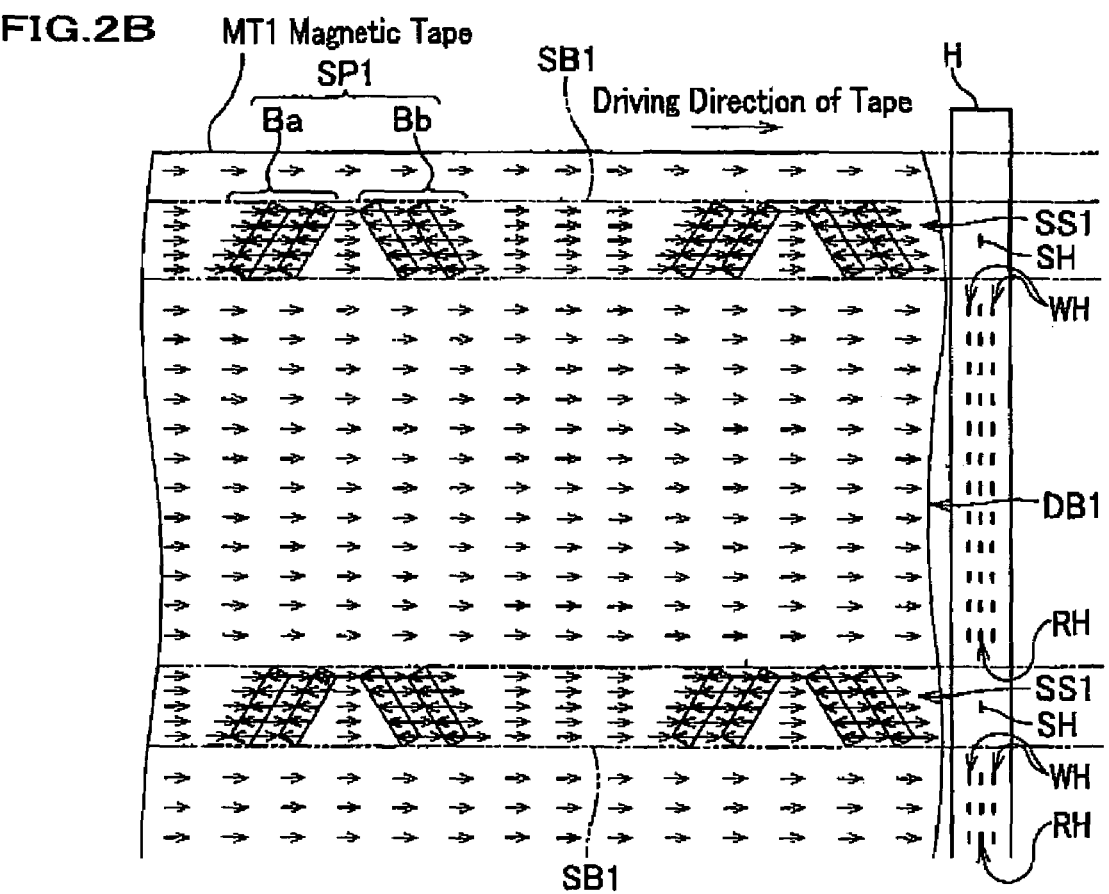
FIG.2B
FIG.2C Reading Signal of Servo Signal

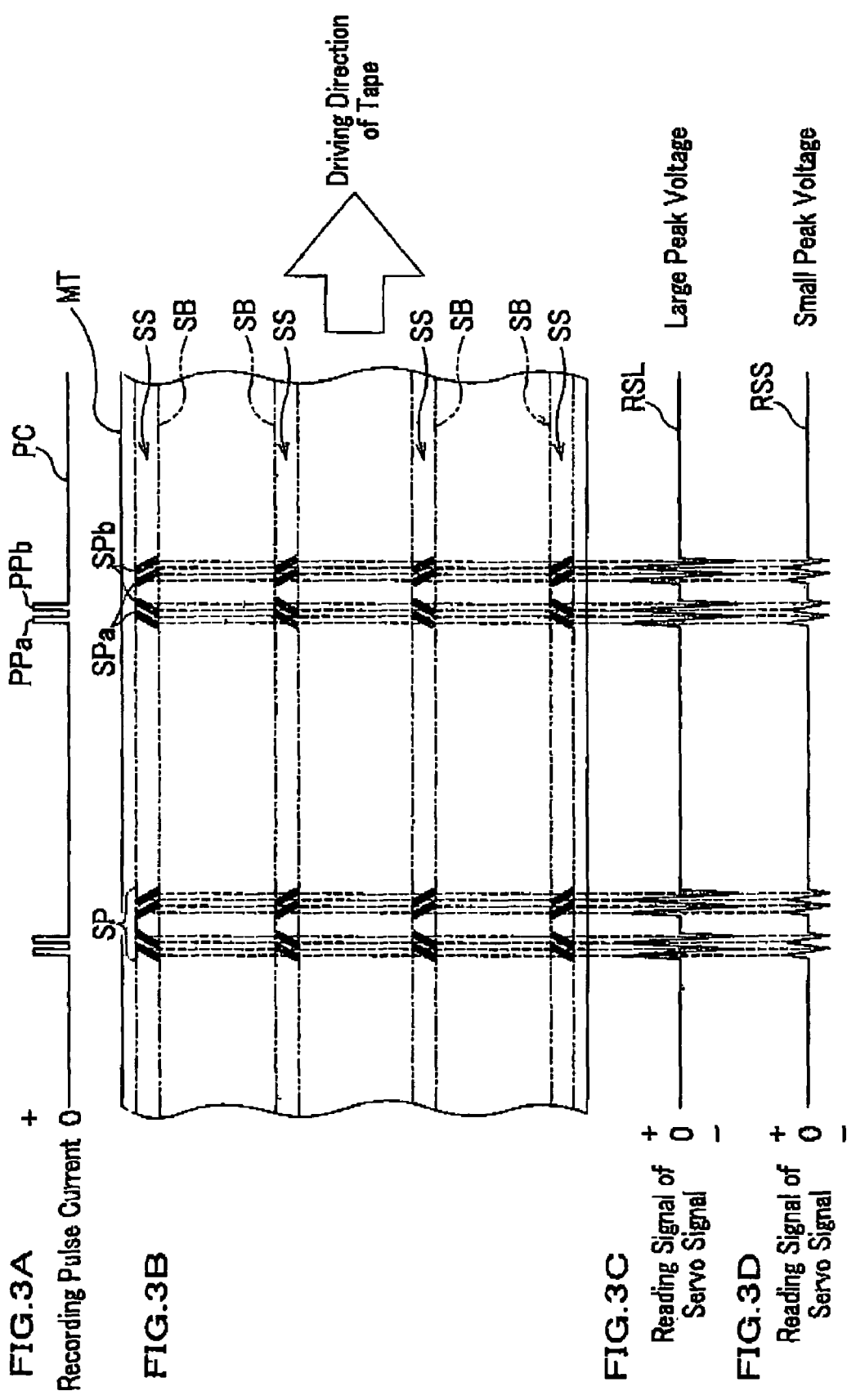

MAGNETIC RECORDING MEDIUM INCLUDING SERVO AND DATA BANDS IN THE MAGNETIC LAYER

FIELD OF THE INVENTION

The present invention relates to a magnetic recording medium. The application of the present invention is based on Japanese Patent Application No. 2003-188335, and No. 2004-161651, disclosure of which are incorporated herein by reference.

DESCRIPTION OF RELATED ARTS

In recent years, a magnetic recording medium has increasingly be able to recorded at higher density, for example, there exists a recording medium for backing up data for computer has a capacity as high as 100 Gigabytes. For instance, in the case of magnetic tape, the formation of several hundreds of data track in a width direction makes it possible to realize the magnetic tape capable of recording at high density. In this connect, the width of the data track becomes very narrow accordingly, and a space between neighboring data tracks also becomes very narrow. For this reason, there is a technique has been suggested in Japanese Patent Laid-Open No. 6-30942 where a servo signal has been recorded on a magnetic tape in advance, the position of a magnetic head (the position of the magnetic tape in the width direction) is servo-controlled, while reading the servo signal by the magnetic heat, whereby the recording/reading element of the magnetic head is traced on the data track.

As a system for controlling the position of the magnetic head by a servo signal, a method for modulating width of amplitude, which controls the position through the output balance of the read pulse signal, a TBS (Timing Based Servo) method, which controls the position through the timing of the read pulse signal.

In the system for recording the servo signal on the magnetic tape in TBS method, for example, as shown in FIG. 3, a non parallel pattern of servo signal SP is recorded by a servo recording head (not shown), while transferring the tape through a tape transferring system. Then, the non-parallel servo signal pattern SP is recorded by imparting recording current to a servo band on a non-magnetized magnetic tape so as to be magnetized in one direction.

Specifically, as shown in FIG. 3B, in the conventional TBS method, in order to avoid saturation phenomenon of the servo signal reading element (MR element), recording pulse current PC comprising zero current and plus pulse signal shown in FIG. 3A is run and formed.

When such recording pulse current PC is used, the magnetic tape MT is not magnetized only within the region of servo pattern SP in the case of the zero current of the recording pulse current PC, and if the plus pulse current is run, the servo pattern SP is magnetized in one direction. As a result, the servo signal SS is written. A head gap of the magnetic head (not shown) for writing the servo signal SS has a non-parallel reversed V, and thus, the servo pattern SPa shown in FIG. 3B is magnetized relative to the plus pulse current PPa shown in FIG. 3A, and further the servo pattern SBp is magnetized relative to the plus pulse current PPb.

On the other hand, in the device for recording/playing a magnetic tape the change in the magnetic field of the servo signal SS is detected by the change in the electric resistance through the servo signal reading element, and is outputted as a differential waveform (voltage value) as the reading signal. For this reason, as the change is the electric resistance of the servo signal reading element becomes large, the peak voltage value of the servo signal reading element becomes large, enhancing an S/N ratio of the reading signal. Consequently, in the case where the change in the servo signal SS itself is large or in the case where the region to be read is large due to wide width of the servo signal reading element, the peak voltage value of the reading signal RSL of the servo signal becomes large.

However, in the magnetic recording medium, it is expected that the recording capacity per one cartridge becomes much higher dense up to several terabytes.

Accompanying with higher dense recording, in the case of the magnetic tape, the number of the data tracks is increased, the space between the neighboring data tracks becomes much more narrower, and the thickness of the magnetic tape becomes thinner. This decreases the magnetic amount, which can be detected at the time of reading the servo signal SS, and reduces the change in the magnetic amount of the servo signal SS, which can be detected by the servo signal reading element. Consequently, as shown in FIG. 3D, the peak voltage value of the reading signal RSS of the servo signal SS becomes small, and the S/N ratio of the reading signal RSS is deteriorated. As a result, the recording/playing device of the magnetic tape cannot read the servo signal SS in a precise manner, and highly precise control of the position cannot be performed.

An object of the present invention is to provide a magnetic recording medium, which possesses a thin magnetic layer suitable for highly dense recording, and simultaneously has an improved S/N ratio of the reading signal of the servo signal, whereby a good SIN ratio of the data signal is attained.

SUMMARY OF THE INVENTION

The present invention relates to a magnetic recording medium having a magnetic layer containing magnetic powder provided on a support:
  said magnetic layer possessing a servo band in which a servo signal for controlling tracking of a magnetic head, and a data band on which a data is recorded;
  said servo signal being magnetized and recorded on said servo band, having been magnetized in one direction of the track direction thereof, in the direction other than said one direction; and
  the thickness of said magnetic layer ranging from 10 to 180 μm variation [standard deviation] in the product of the residual magnetism by the thickness of the magnetic field being not more than 30%.

BRIEF DESCRIPTION OF THE DRAWINGS

FIG. 2 shows an explanatory view showing the magnetic tape (magnetic recording medium) according to an embodiment of the present invention, where FIG. 2A is a drawing showing a recording signal used for recording the servo signal and providing the servo band, FIG. 2B is an enlarged plane view explaining the magnetized conditions of the magnetic tape, and FIG. 2C is a drawing showing the servo signal read from the servo band of the magnetic tape.

FIG. 3 shows an explanatory view showing the magnetic tape having the conventional servo signal where FIG. 3A is a drawing showing a recording signal used for recording the servo signal and providing the servo band, FIG. 3B is an enlarged plane view explaining the magnetized conditions of the magnetic tape, FIG. 3C is a drawing showing the reading signal of the servo signal when the peak voltage is large, and FIG. 3D is a drawing showing the reading signal of the servo signal when the peak voltage is small.

DESCRIPTION OF THE PREFERRED EMBODIMENTS

Figure 1A:
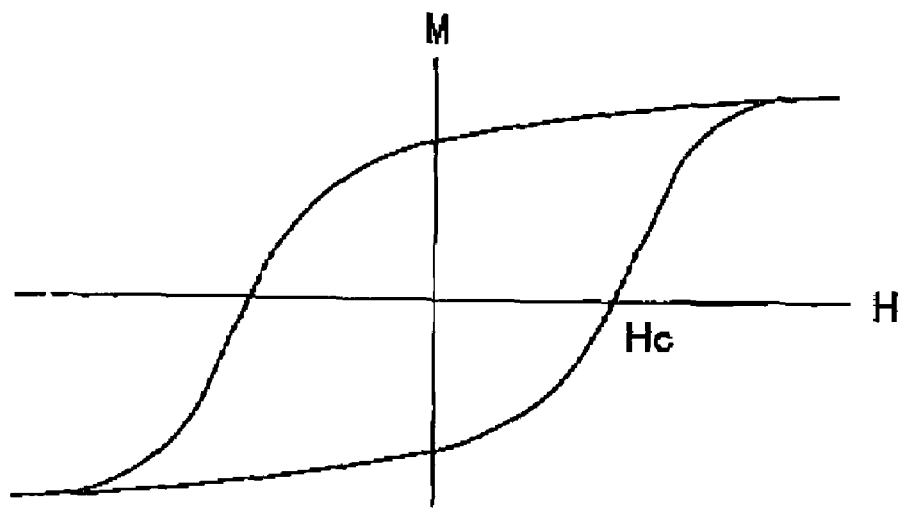
FIG. 1A is a graph showing the relation between the applied magnetic field (H) and the magnetization (M) of the recording medium.

The preset invention will now be described by referring to the attached drawings as occasion may demand.

The shape of the magnetic recording media according to the present invention is not specifically restricted, and the magnetic recording media may be formed into any shapes such as tape, sheet and disc shape. Amongst them, a sheet shaped or tape-shaped magnetic recording media whose magnetic recording/playing direction is longer than the direction perpendicular thereto is particularly preferable. In the followings, the embodiments where the magnetic recording media according to the present invention is applied to a magnetic tape will be described.

The materials and shapes of the supports, which can be used in the present invention, are also not specifically restricted, and those having a film shape are preferable in the case of being applied to the magnetic tape. In this embodiment, an embodiment where a base film is used as the support will be described.

Also, in the case where the magnetic recording media according to the present invention is applied to a magnetic tape, the direction of the track is preferably the lengthwise direction of the tape. In the following, the embodiment where the direction of the track is the lengthwise direction of the tape will be described.

[Servo Signal]

First, the servo signal will be described. The servo signal used in the present invention is recorded and played through the magnetic recording, and any of optimal form of the signal (servo pattern) may be used. Examples include, but are not restricted to, a method for modulating width of amplitude, which controls the position through the output balance of the read pulse signal, a TBS (Timing Based Servo) method, which controls the position through the timing of the read pulse signal. FIG. 2 shows an explanatory view showing the magnetic tape (magnetic recording medium) according to an embodiment of the present invention utilizing a TBS method, where FIG. 2A is a drawing showing a recording signal used for recording the servo signal and providing the servo band, FIG. 2B is an enlarged plane view explaining the magnetized conditions of the magnetic tape, and FIG. 2C is a drawing showing the servo signal read from the servo band of the magnetic tape.

As shown in FIG. 2B, on a magnetic tape MT1 according to this embodiment, a plurality of servo bands SB1 extending towards the lengthwise direction of each tape are provided in the width direction, and data bands DB1 are each provided on each space between the servo bands SB1. Each servo band SB is magnetized in the normal direction of the lengthwise direction of the magnetic tape MT. In FIG. 2B, the magnetized direction is shown by a small arrow. As shown in FIG. 2A, by running a recording pulse current PC1 comprising zero current (ZC1) and a plus pulse current (PP1), the servo band SB1 is magnetized in the reverse direction to write the servo signal SS1. The servo signal SS1 forms one servo pattern SP1 by burst Ba, which is a magnetized portion in a state of two stripes each having positive inclination angle relative to the driving direction, and the following burst Bb, which is a magnetized portion in a state of two stripes each having negative inclination angle relative to the driving direction, and such servo patterns SS1 are repeatedly formed in the lengthwise direction at prescribed intervals to form the servo signal SS1.

The Data band DB1 between each of servo bands SB1 is also magnetized in the normal direction in a uniform manner. It is needless to say that the magnetic tape MT1 shown in FIG. 2B is not recorded, and when data is recorded, magnetized portions in the reverse or normal direction are formed on the data band DB1 depending upon the contents of data.

While the servo pattern SP1 is composed of two stripes each positively and negatively inclining in this embodiment, the construction of the servo pattern SP1 may be suitably modified. For example, it may be composed of five stripes each positively and negatively inclining, or five stripes each positively and negatively inclining and four stripes each positively and negatively inclining may be alternatively formed. For better understanding, the servo pattern SP1 is shown exaggeratedly relative to the magnetic tape MT1.

FIG. 2B shows the positional relation of the magnetic head H relative to the magnetic tape MT1. On the magnetic head H, a plurality of servo signal reading elements SH for reading the servo signal SS1 are arranged and provided at the same intervals as those of the plurality of the servo bands SB1 in the width direction of the magnetic tape MT1 (hereinafter referred to as "width direction"). The dimension of the reading element SH in the width direction is set so as to be smaller than the width of the servo band SB1. Between the servo signal reading elements SH, a plurality of recording elements WH are provided for recording the signal on the data band DB1 in the width direction arranged at two columns. Furthermore, between the recording elements WH, a plurality of playing elements RH are provided in the width direction arranged at one column.

When data is recorded or played with the magnetic head of the tape drive (not shown) for the magnetic tape MT1, the servo signal SS1 is read out through the servo signal reading elements SH. The servo pattern SP1 of the servo signal SS1 is inclined relative to the driving direction (=lengthwise direction) of the magnetic tape MT1 and is composed of mutually non-parallel stripes. Consequently, the timing, where the servo signal reading elements read the servo signal SS1 and detect the pulse, is different depending upon the relative position between the magnetic tape MT1 and the magnetic head H in the width direction. For this reason, by controlling the position of the magnetic head H so as to set the timing for reading the pulse (phase shift) to be prescribed conditions, the recording element WH or the playing element RH can be positioned to a prescribed track of the data band DB in a precise manner.

At this time, the output (peak voltage value) where the servo signal reading element SH reads out the servo signal SS1 depends upon the changing ratio and changing amount of the magnetism at the portion where a signal is recorded being shifted to a portion where no signal is recorded. In this embodiment, at the basic portion of the servo band SB1 magnetized in the normal direction being shifted to the servo pattern SP1 magnetized in the reverse direction, the direction of the magnetism is greatly changed from the normal direction to the reverse direction.

Also, at the portion where the servo pattern SP1 magnetized in the reverse direction, the direction of the magnetism is shifted to the basic portion of the servo band SB1 magnetized in the normal direction, the direction of the magnetism is greatly changed from the reverse direction to the normal direction. For this reason, the reading signal from the servo band becomes a signal having a large output variation as shown in FIG. 2C. Consequently, an S/N ratio of the servo signal SS1 can be enhanced.

The recording of the servo signal SS1 is carried out through means, which possesses a first stage for at least magnetizing the servo signal SS1 in the normal direction of the lengthwise direction, and a second stage for imparting the recording pulse current PC1, which induces a singly directed magnetic flux for magnetization in the reverse direction, to a servo signal-recording head (not shown) to thereby write the servo signal SS1 on the servo band SB1 (hereinafter the means for recording the servo signal via the first and the second stages referred to as "two-may magnetization means".

In the first stage, in order to magnetize the servo band SB1 in the normal direction of the lengthwise direction, the magnetic head may be used to directly magnetize the servo band SB1 (hereinafter referred to as "two-way magnetization 1"), or a permanent magnet such as made of rare metal magnet may be used to magnetize the whole of the tape in the normal direction of the lengthwise direction (hereinafter referred to as "two-way magnetization 2"). In the latter case, as shown in FIG. 2B, portions except for the servo band such as the portion of the data band DB1 are also uniformly magnetized. Whereas the basic portion of the servo band SB1 is magnetized in the normal direction and the portion of the servo pattern SP1 is magnetized in the reverse direction in this embodiment, it is also possible that the basic portion of the servo band SB1 may be magnetized in the reverse direction and the portion of the servo pattern SP1 is magnetized in the normal direction. As shown in FIG. 2B, whereas the data band DB1 is similarly magnetized in the normal direction in this embodiment, the magnetism of the data band DB2 may be erased by possessing a separate magnetism-erasing stage.

In the two-way magnetization means may include the first and the second stages on this order, and any other stages may be provided. For example, after the first stage, a stage for cutting the tape may be provided, after which the second stage may be performed.

Also, while the servo signal SS1 is written utilizing the servo signal-recording head, so-called magnetic transcription method may be applied where in the state where a medium onto which the servo signal SS1 is come into contact with a master carrier (pattern master) in which a pattern of the servo signal SS1 has been preformed in a convex and concave state or in a embedded construction, a transcription magnetic field is applied to make a transcription of the servo signal SS1 corresponding to the information carried on the master carrier.

[Recording/Playing Method]

The magnetic recording medium according to the present invention is preferably used in a magnetic recording/playing device whose linear recording density is not less than 100 kfci, the difference between the width of the recording track (the width of the track recorded by the recording element MH) and the width of the playing track (the width read out by the playing element RH) is from 0 to 16 μm. Specifically, in the case of the system having the difference between the width of the recording track and the width of the playing track exceeding 16 μm, even if the position of the magnetic head H is changed approximately several microns due to a small S/N ratio of the reading signal RS of the servo signal SS1, which results in failure to high precision controlling of the position of the magnetic head H, the playing element RH of the magnetic head H can be driven on the recording track with no problem. However, in the case of the magnetic recording/playing device whose liner recording density is high, which should make the difference between the width of the recording track and the width of the playing track not more than 16 μm, since the width of the servo signal reading element SH becomes small according to the pitch of the recording track, the change in the magnetized amount of the servo signal, which can be detected, becomes small, deteriorating an S/N ratio of the reading signal. As a result, the magnetic recording device cannot read the servo signal in a precise manner, making it difficult to control the position of the magnetic head H. Consequently, the effect of the magnetic recording media of the present invention becomes significant when a magnetic recording/playing device having a high linear recording density.

The linear recording density is preferably not less than 100 kfci, more preferably not less than 120 kfci, and still more preferably not more than 140 kfci.

The width of the recording track is preferably not more than 25 μm, and more preferably not more than 15 μm.

The width of the playing track is preferably not more than 15 μm, and more preferably not more than 10 μm.

The difference between the width of the recording track and the width of the playing track is preferably in the range of 0 to 16 μm, more preferably from 0 to 12 μm, and still more preferably from 0 to 8 μm.

The effect of the magnetic recording medium according to the present invention is significantly exhibited when a linear serpentine method which carries out two-way recording and playing in the lengthwise direction.

[Construction of Layers]

Subsequently, with regard to the construction of the layer of the magnetic recording medium according to the present invention, preferable embodiments will be described. In the present invention, non-magnetic layer at least comprising a non-magnetic powder and a binder is preferably provided on a base film, and a magnetic layer is preferably provided on the non-magnetic layer. In the magnetic recording medium as described above, since the non-magnetic layer at least comprising a non-magnetic powder and a binder is provided below magnetic layer, the surface coarseness of the magnetic layer becomes an appropriate value, making it possible to reduce the frequency of generating servo error.

A back coat layer may be provided on the base film at the opposite side of the magnetic layer. As for the thickness, the base film is preferably from 1 to 100 μm, more preferably from 4 to 80 μm; the total thickness of the magnetic layer and the non-magnetic layer is preferably within the range of 1/100 to twice, more preferably from 1/100 to 1 time, and still more preferably 1/100 to 30/100 times, the thickness of the base film. In the case of providing the back coat layer, the thickness of the back coat layer is from 0.1 to 2 μm, preferably from 0.3 to 1 μm, and more preferably from 0.3 to 0.6 μm. In order to enhance the adherent property, a primer coat may be provided in between the base film and the non-magnetic layer. The thickness of the primer coat, if provided, is 0.01 to 2 μm, and preferably 0.02 to 0.5 μm. Any of the known primer coat may be used. The magnetic recording medium according to the present invention may include layers other than the non-magnetic layer, the magnetic layer, and the back coat layer, examples of which include a cushion layer, an overcoat layer, an adhesive layer, and a protective layer. These layers may be provided on appropriate portion in order to effectively exhibit their functions.

[Magnetic Layer]

The magnetic layer used in the present invention is obtained by applying an application liquid prepared by dispersing magnetic powder in a binder to the base film. The application methods, which can be used, include, but are not restricted to, a method for directly applying the application liquid for the magnetic layer onto the base film, and a method for simultaneously applying the application liquid for the non-magnetic layer and the application liquid for the magnetic layer onto the base film. The thickness of the magnetic layer is from 10 to 180 nm, preferably 30 to 180 nm, and more preferably from 40 to 160 nm. The thinness of the magnetic layer not less than 10 nm secures a preferred output of the servo signal. The thinness of the magnetic layer not more than 180 nm improves good resolution property of the written servo signal, resulting in a high S/N ratio of the servo signal.

The corrective force Hc of the magnetic layer is from 127 to 356 kA/m, preferably from 142 to 316 kA/m, and more preferably from 158 to 177 kA/m. Hc not more than 127 kA/m gives a high output, and reduces the influence of diamagnetism even if the recording wavelength becomes small. Hc exceeding 356 kA/m sometimes makes it difficult to perform recording through the magnetic head. Consequently, Hc is preferably not more than 356 kA/m.

A product of a residual magnetism value by the thickness of the magnetic layer (Mrt) of the magnetic layer is preferably $5.0 \times 10^{-10}$ T·m to $7.5 \times 10^{-8}$ T·m, more preferably $5.0 \times 10^{-10}$ T·m to $5.0 \times 10^{-8}$ T·m, and still more preferably $5.0 \times 10^{-10}$ T·m to $2.5 \times 10^{-8}$ T·m. Setting Mrt within the range of from $5.0 \times 10^{-10}$ T·m to $7.5 \times 10^{-8}$ T·m prevents the saturation of the MR element, reducing noise.

The variation in Mrt in the lengthwise direction is not more than 30%, preferably not more than 25%, and still more preferably not more than 20%. The variation in Mrt not more than 30% gives good S/N ratio of the servo signal and the data signal.

There are various methods for setting the variation in Mrt within an appropriate range, examples include, but are not restricted to:

(1) In the case of the method for directly applying the application liquid for the magnetic layer onto the base film, the variation in the thickness of the base in the lengthwise direction is not more than 30%, and pulsation of the pump for transferring the application liquid for the magnetic layer is minimized; and (2) In the case of the method using the non-magnetic layer, the variation in the thickness of the base in the lengthwise direction is not more than 30% similar to method (1), and pulsation of the pump for transferring the application liquid for the magnetic layer and the pump for transferring the application liquid for the non-magnetic layer should be minimized. When a thixotropic application liquid is used for the non-magnetic layer, the variation in Mrt can be much more suppressed. Also, if so called wet on dry method, where the application liquid for the magnetic layer is applied after drying the non-magnetic layer is used, the variation in Mrt can be much more suppressed. A calendaring stage may also be provided after drying the non-magnetic layer and before applying the application liquid for the magnetic layer.

Figure 1B:
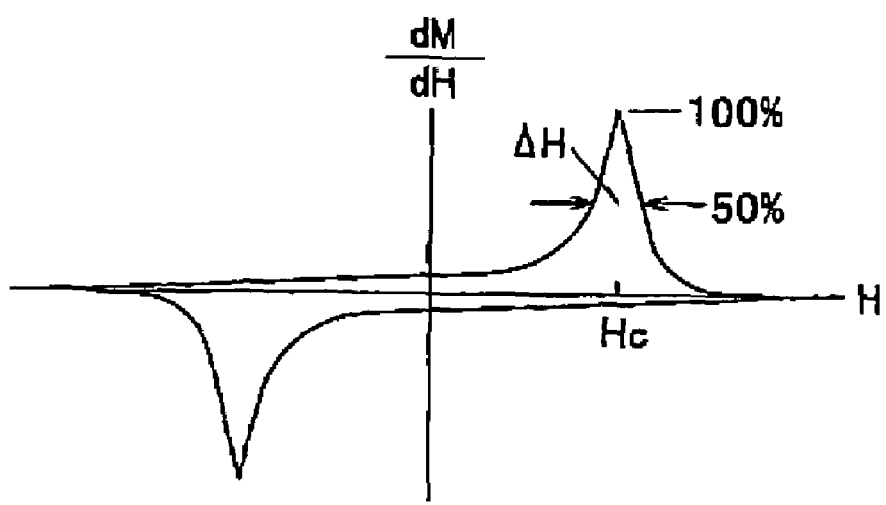
FIG. 1B is a graph showing a differential curve of FIG. 1A.

Switching field distribution of the magnetic layer (which is a value expressing magnetism reversibility of the magnetic layer, and which will be abbreviated as "SFD") is from 0.10 to 0.70, preferably from 0.15 to 0.65, and more preferably from 0.15 to 0.60. As shown in FIG. 1, SFD is calculated from a differential curve FIG. 1B of a magnetization curve (FIG. 1A) showing the relation between the applied magnetic field (H) and the magnetization of the recording medium (M). When half band width of dM-H curve shown in FIG. 1B is taken as ΔH, and the coercive force of the recording medium is taken as ΔHc, SFD is defined as:

$$SFD = \Delta H/\Delta Hc,$$

As SFD is smaller, the starting up of the magnetization is sharp. For this reason, the width of reversed magnetization region of the recording signal becomes narrow, and good magnetization reversibility can be exhibited.

By setting SFD to be not more than 0.70, the width of the magnetization reverse region can be narrow, obtaining a good S/N ratio of the servo signal.

SFD is decreased as the particle distribution of the magnetic powder particles is sharp. In order to sharpen the particle distribution, the production reaction system of the magnetic powder becomes uniform at the fullest extent, and the magnetic powder produced is treated with any of know treatments for improving the particle distribution. Even if such a treatment is applied, it is difficult to adjust the particle distribution to be not more than 0.10. The lower limit of SFD is set to be 0.10.

An average coarseness at a central surface of the magnetic layer SRa measured by HD-2000 available from WYKO is preferably from 1 to 5 nm, and more preferably from 1.5 to 4.5 nm. Setting SRa within this range suppress an error rate.

A ratio $R(\phi_0/\phi_1)$ where the residual magnetism of this portion except for the servo band is taken as $\phi_0$, and the residual magnetism of portion being applied to an external magnetic field of 1T is from 0.01 to 0.30, preferably from 0.04 to 0.25, and more preferably from 0.04 to 0.20. R within this range can give a high S/N ratio when the data is read out through the data reading element.

Various methods can be used for setting the ratio $R(\phi_0/\phi_1)$, and for example, the following methods can be applied:

(1) When the whole of the tape is magnetized in the normal direction of the driving direction in the two-way magnetization described above, the degree of the magnetism to be applied is adjusted.

(2) When the data band DB1 has been similarly magnetized, and the magnetized data band DB1 is erased by providing a separate magnetism erasing stage, the degree of the erasing magnetic field at the time of erasing is controlled.

As the magnetic powder, which can be used in the magnetic layer of the present invention, preference is given to use strongly magnetic metal powder or hexagonal ferrite magnetic powder. In the case of the strongly magnetic metal powder, needle-like alloy powder comprising Fe as main component and further containing Co, Mn, Ni, Sm, Nb, and the like.

A compound of Al, Y or such may be used as an anti-sintering agent. The average long axis length of strongly magnetic metal powder is preferably from 30 to 100 nm, more preferably from 35 to 90 nm, and still more preferably from 40 to 80 nm. The average long axis length not more than 100 nm reduce noise, obtaining good S/N ratio of the servo signal and the data signal. The average long axis length not less than 30 nm secures good corrective force Hc.

The average needle ratio of the strongly magnetic metal powder is preferably from 3 to 10, more preferably from 3 to 8, and still more preferably from 4 to 8.

The variation in the long axis length of the strongly magnetic metal powder [(standard deviation of the long axis length)/(average of the long axis length)] is preferably not more than 30%, more preferably not less than 25%, and still more preferably not less than 20%. The variation in the long axis length not more than 30% reduces noise generated due to the co-existing magnetic particles having different long axis length, making it possible to enhance an S/N ratio of the servo signal and data signal.

A saturated magnetized amount σs of the strongly magnetic metal powder is preferably from 80 to 140 A·m$^2$/kg, and more preferably from 90 to 125 A·m$^2$/kg. The corrective force Hc thereof is preferably from 127 to 356 kA/m, more preferably from 142 to 316 kA/m, and still more preferably from 158 to 177 kA/m.

The BET specific surface area (SBET) of the strongly magnetic metal powder is preferably from 40 to 80 m$^2$/g, and more preferably from 45 to 75 m$^2$/g. The BET specific surface area ($S_{BET}$) not less than 40 m$^2$/g reduces noise, and the BET specific surface area ($S_{BET}$) not more than 80 m$^2$/g gives good surface properties.

Amongst hexagonal ferrite magnetic powders, Ba ferrite is proven to be suitable. Also, Ti may be included as a substituted element. The average plate length of the hexagonal ferrite magnetic powder is preferably from 15 to 50 nm, more preferably from 20 to 45 nm, and still more preferably from 20 to 40 nm. Similar to the use of the strongly magnetic metal powder, the average plate length of not more than 50 nm reduces noise, obtaining good S/N ratios of the servo signal and data signal. Also, the average plate length not less than 15 nm secures good corrective force Hc.

The average plate ratio of the hexagonal ferrite magnetic powder is preferably from 2 to 7, and more preferably from 3 to 5.

The variation in the plate length of the hexagonal ferrite magnetic powder [(standard deviation of the plate length)/(average of the plate length)] is preferably not more than 30%, more preferably not less than 25%, and still more preferably not less than 20%. The variation in the plate length of not more than 30% reduces noise generated due to the co-existing magnetic particles having different plate length, making it possible to enhance S/N ratios of the servo signal and data signal.

A saturated magnetized amount σs of the hexagonal ferrite magnetic powder is preferably from 40 to 80 A·m$^2$/kg, and more preferably from 45 to 65 A·m$^2$/kg. The corrective force Hc thereof is preferably from 127 to 356 kA/m, more preferably from 142 to 316 kA/m, and still more preferably from 158 to 177 kA/m.

The BET specific surface area of the hexagonal ferrite magnetic powder within this particle size range is from 10 to 200 m$^2$/g. This specific surface area is substantially accorded with the calculated value from the plate length of particle and the plate thickness.

The binder which can be used in the magnetic layer of the present invention may be any of the known binders. Examples include, but are not restricted to, vinyl chloride copolymer, polyurethane resin, acrylic resin, and mixture thereof. The number average molecular weight of these resins is from 20,000 to 100,000, and preferably from 30,000 to 80,000. In order to enhance dispersibility of the magnetic powder, a polar group may be preferably introduced into these resins. The polar groups, which have been known, are —COOM, —SO$_3$M, —P=O(OM)$_2$ (where M is hydrogen atom or an alkali metal).

Furthermore, into the magnetic layer, an abrasive, carbon black, a lubricant may optionally be introduced. The abrasive, which contained, preferably has an average particle size ranging from 10 to 300 nm and has a thickness twice or more the magnetic layer.

[Non-Magnetic Layer]

The non-magnetic layer, which is preferred, at least contains non-magnetic powder and a binder. The non-magnetic powders which can be used may be known powders, including, but being restricted to, TiO$_2$, Fe$_2$O$_3$, Al$_2$O$_3$, Ce O$_2$, BaSO$_4$, ZnO, carbon black, and graphite, with TiO$_2$, and α-Fe$_2$O$_3$ being preferred, and with the combination use thereof with carbon black being particularly preferred. The use of resin into which a polar group is introduced as a binder excels in terms of dispersibility of a metal oxide. The average particle size (average long axis length in the case of the needle particle) is from 10 to 300 nm, and preferably 30 to 200 nm, and a preferred shape thereof is any of granule, needle and dice. Several kinds of the non-magnetic powders may be used as occasion may demand. For example, it is possible to mix a non-magnetic metal oxide, carbon black and the like with the non-magnetic powder in order to impart electric conductivity. The binder for use in the non-magnetic powder may be the known binder similar to the magnetic layer. Furthermore, an antistatic agent, a lubricant and the like may be incorporated into the non-magnetic layer.

[Base Film]

The base film which can be used in the present invention are conventionally known films including polyesters such as polyethylene terephtalate; polyolefins; cellulose triacetate, polycarbonate, and polyamide (particularly aromatic polyamide); polyimide, polyamideimide, polysulfone; and aramide. A corona discharge treatment, a plasma treatment, an adhering treatment, a thermal treatment, a dust-removing treatment or any other treatment may be previously subjected to the base film. In order to attain the object of the present invention, the base film must possess an average surface coarseness at the central line Ra (cutoff value: 0.25 nm) of not more than 0.03 μm, preferably not more than 0.02 μm, and still more preferably not less than 0.01 μm. More preferred base film has no large projection having a size of not less than 1 μm in addition to low average surface coarseness at the central line Ra. The shape of the surface coarseness can be freely controlled by the size and amount of the filler added to the base film as occasion may demand.

An F-5 value of the base film used in the present invention in the lengthwise direction is preferably from 5 to 50 kg/mm$^2$, and that in the width direction is preferably from 3 to 30 kg/mm$^2$. It is general that the F-5 value in the lengthwise direction is higher than the F-5 value in the width direction, but it is not essential when the strength of the width direction should be particular enhanced. The thermal shrinkage of the base film in the lengthwise direction and in the width direction at 100° C. for 30 minutes is preferably not more than 3%, and more preferably not more than 1.5%, and the thermal shrinkage thereof at 80° C. for 30 minutes is preferably not more than 1% and more preferably not more than 0.5%. The break strength both in the lengthwise direction and the width direction is preferably from 5 to 100 kg/m$^2$, and the modulus both in the lengthwise direction and the width direction is preferably from 100 to 2000 kg/m$^2$.

[Back Coat Layer]

The back coat layer which can be used in the present invention may be the conventional back coat layer, and preferably a back coat layer having a binder and carbon black contained therein. The back coat layer may comprise carbon black, which comprises fine particles and excels in electric conductivity, as main filler, and may also contain two types of carbon black each having a different average particle size, and may optionally contain an inorganic powder. The amount of the inorganic powder compounded in the back coat layer is usually from 0.5 to 150 parts by weight, and preferably from 0.5 to 100 parts by weight, based on 100 parts by weight of carbon black.

As described previously, two types of carbon black each having a different average particle size may be introduced into the back coat layer. For example, fine granular form carbon black whose average particle size is from 15 to 50 nm and coarsely granular form carbon black whose average particle size is from 80 to 300 nm may be used. As described above, two types of carbon black may be used to make the surface of the back coat layer coarse whereby a magnetic recording medium having low backside transcription can be obtained.

Generally, the addition of the finely granular form carbon black can set the surface electric resistance of the back coat layer at low and set light permeability at low. Since many of devices utilize light permeability of the tape to be used in the actuation signal depending upon the magnetic recording device, in such a case, the addition of the finely granular form carbon black becomes particularly available. The finely granular form carbon black excels in corrective force of the lubricant as a rule, and the use thereof contributes the decreasing of friction coefficient when the lubricant is jointly used.

The coarsely granular form carbon black whose average particle size is from 80 to 300 nm has a function for a solid lubricant, and forms a fine projection of the surface of the back coat layer to reduce contact area, contributing the decreasing of the friction coefficient.

Typical commercially available products of the finely granular form carbon black, which can be used, are as follows (in parentheses the average particle size is expressed): REGAL 99R (38 nm), RAVEN 2000B (18 nm), RAVEN 1500B (17 nm) (available from Colombia Carbon Inc.), BP 800 (17 nm) (available from Cabot Inc.), PRINTEX 90 (14 nm), PRINTEX 95(15 nm), PRINTEX 85 (16 nm), PRINTEX 75(17 nm) (available from Degussa), and #3950 (16 nm) (Mitsubishi Chemicals).

Typical commercially available produces of the coarsely granular form carbon black, which can be used, are as follows: Asahi #51 (91 nm) (available from Asahi Carbon), Thermal Black (270 nm) (available from Kurn-Carb), and RAVEN MTP (275 nm) (available from Colombia Carbon Inc.). The coarsely granular form carbon black whose average particle size is from 80 to 300 nm can be selected from carbon black for rubber or carbon black for color.

In the present invention, the proportion of the finely granular form carbon black to the coarsely granular form carbon black contained (weight ratio) is preferably in the range of from 98:2 to 75:25, and more preferably from 95:5 to 85:15. The content of the carbon black (when two types of carbon black is used, the total content of the finely granular form carbon black and the coarsely granular form carbon black) is usually from 30 to 80 parts by weight, preferably from 45 to 65 parts by weight, based on 100 parts by weight of the binder.

As the inorganic powder, which can be added to the back coat layer, inorganic powder having an average powder size of from 80 to 250 nm and having a Mohs' hardness of from 5 to 9 can be mentioned. As the inorganic powder, those similar to non-magnetic powder and the abrasive used in the non-magnetic layer can be used. Amongst them, the use of α-iron oxide, α-alumina or such is preferred. The amount of the inorganic powder added to the back coat layer is preferably in the range of from 0.5 to 40 parts by weight, and preferably from 1 to 30 parts by weight, based on 100 parts by weight of the binder.

The binder for use in the back coat layer may be any of the conventionally known thermoplastic resins, thermosetting resins, and reactive type resins. Preferred binders are vinyl chloride resin, vinyl chloride-vinyl acetate resin, a cellulose plastic like nitrocellulose, phenoxy resin, and polyurethane. Amongst them, vinyl chloride resin, vinyl chloride-vinyl acetate resin and polyurethane can be preferably used.

In addition to the components described above, a dispersant and a lubricant may optionally be added to the back coat layer. Examples of the dispersants include, but are not restricted to, aliphatic acid having 12 to 18 carbon atoms (RCOOH, where R is an alkyl group or alkenyl group having 11 to 17 carbon atoms) such as caprylic acid, capric acid, lauric acid, myristic acid, palmitic acid, stearic acid, behenic acid, oleic acid, elaidic acid, linolic acid, linoleic acid, and stearolic acid; metal soaps comprising an alkaline or alkaline earth metal salt of the above aliphatic acid; compounds of the aliphatic acid esters further containing fluorine atom; amides of the above aliphatic acids; polyalkylene oxide alkyl phosphates; lecithin; trialkyloxypolyolefinoxy quaternary ammonium salts (alkyl having 1 to 5 carbon atoms; olefin including ethylene and propylene), sulfuric esters, copper phtalocyanine, and subsidence barium sulfate. The dispersant may be added in an amount of from 0.5 to 20 parts by weight based on 100 parts by weight of the binder.

The back coat layer is provided on the opposite side of the magnetic layer supported by non-magnetic support according to the usual method. Specifically, an application liquid in which the components described above are dissolved or dispersed in an appropriate organic solvent is prepared, which is then applied according to the usual method, and then dried, to provide the back coat layer on the non-magnetic support. In the present invention, the back coat layer preferably has an average surface coarseness Ra of from 20 to 30 nm, and more preferably from 22 to 28 nm. Since the surface coarseness of the back coat layer has an influence upon playing output and an influence upon the friction coefficient relative to a guide pole due to the fact that the surface of the back coat layer is transferred onto the surface of the magnetic layer under the situation that the tape is wound, it is preferably adjusted within the above range. The adjustment of the surface coarseness Ra can be carried out after the application and formation of the back coat layer and in the surface treatment stage, by adjusting the calendar roll used, it surface properties, pressure and the like. In the present invention, the thickness of the back coat layer is from 0.1 to 2 μm, preferably from 0.3 to 1.0 μm, and more preferably from 0.3 to 0.6 μm.

[Production Method]

Describing a suitable example of the production method of the magnetic recording material of the present invention, a method at least comprising as production stages a stage for preparing an application liquid for the magnetic layer; a state for applying the application liquid for the magnetic layer on the base film, an orientation stage for orienting the magnetic body through a rare earth magnet or such, a drying stage, a calendaring stage for enhancing surface smoothness through rollers, a slitting stage, and a stage for recording the servo signal. In the case of providing the non-magnetic layer, a stage for preparing an application liquid for the non-magnetic layer and an application stage are separately added. The method for producing the magnetic recording medium having a non-magnetic layer provided thereon will now be described. The method for producing the magnetic recording medium according to the present invention is not restricted to the method shown below, and a stage for providing the back coat layer or other stage may be added.

The preparation stages for preparing the application liquids for the magnetic layer and for the non-magnetic layer each at least comprises a kneading stage and a dispersion stage. Before and after these stages, a mixing stage may be provided. Furthermore, each stage may be divided into two stages. All the raw materials used in the present invention such as the strongly magnetic metal powder, the hexagonal ferrite magnetic powder, the non-magnetic powder, the binder, carbon black, the abrasive, the anti-static agent, and the lubricant may be added in any stage at the first or during the course of the stage. Individual raw materials may be added to two or more stage in portions. For example, polyurethane resin may be added in portions in the kneading stage, the dispersion stage, and the mixing stage after the dispersion and for adjusting the viscosity.

In order to obtain the magnetic layer having a high residual magnetism to be used in the present invention, an apparatus having a strong kneading force such as a continuous kneader, or a compression kneader, is preferably used in the stage for kneading the application liquid for the magnetic layer. In the case of using a kneader, the magnetic powder and the binder in an amount of from 15 to 500 parts by weight based on 100 parts by weight of the magnetic powder are kneaded. It is preferred for dispersing the application liquid for the non-magnetic layer to use a dispersion medium having a high specific gravity. The dispersion media, which can be preferably used, are zircona bead, titania bead, steel bead, and the like.

The application stage for applying the application liquid may be carried out in any of the known methods, for example, as follows:

(1) A method in which first the application liquid for the non-magnetic layer is applied by a gravure application, a blade application, an extrusion application device, or any other application device, and then while the non-magnetic layer being in wet, the application liquid for the magnetic layer is applied by a base-film compression type extrusion application device disclosed in Japanese Examined Patent Publication No. 1-46186, Japanese Patent Laid-Open No. 60-238179, Japanese Patent Laid-Open No. 2-265672 (all of which are incorporated herein by reference).

(2) By means of one application head having two built-in slits for transferring the application liquid, as disclosed in Japanese Patent Laid-Open No. 2-265672, which is incorporated herein by reference, the application liquids for the non-magnetic layer and for the magnetic layer are applied in a substantially simultaneous manner.

(3) By means of an extrusion application device equipped with a backup roll as disclosed in Japanese Patent Laid-Open No. 2-174965, which is incorporated herein by reference, the application liquids for the non-magnetic layer and for the magnetic layer are applied in a substantially simultaneous manner.

It is noted that when the method for using a thixotropic application liquid is used for the non-magnetic layer or an application method utilizing the wet on dry method is used as described above, the variation in Mrt can be much more suppressed.

In order to prevent the magnetic recording medium from decreasing electromagnetic characteristics and other characteristics due to the aggregation of the magnetic powder particles, shearing force is preferably applied to the application liquid within the application head by means of a method, for example, as disclosed in Japanese Patent Laid-Open No.62-95174 and Japanese Patent Laid-Open No. 1-236968, which are incorporated herein by reference. Furthermore, if the viscosity of the application liquid fulfils the range disclosed in Japanese Patent Laid-Open No. 3-8471, which is incorporated herein by reference, the aggregation of the magnetic powder particles can be much more prevented.

The orientation stage for orienting the magnetic body can be carried out by any of the known methods, for example, by a method in which rare earth magnets are alternatively arranged in an inclined manner to orient the magnetic body at random or by a method for applying an alternating magnetic field through a solenoid to orient the magnetic body at random. However, since strong orientation should be performed for obtaining the magnetic recording medium according to the present invention, it is preferred that the orientation stage is performed by an orientation method utilizing a rare earth magnet having 0.2 T or more magnetic force in combination with an orientation method utilizing a solenoid having 0.1 T or more magnetic force. Furthermore, in order to enhance the orientation, an appropriate drying stage is preferably carried out prior to the orientation.

The calendar stage for enhancing the surface smoothness through rolls is preferably carried out between a plastic roll and a metal roll or metal rolls. The plastic rolls which can be used in the calendar stage are those made of heat resistant plastic such as epoxy, polyimde, polyamide, and polyamideimide resins.

The calendar temperature is preferably not less than 70° C., and more preferably not less than 80° C. The linear pressure of the rolls are preferably not less than 200 kg/cm, and more preferably not less than 300 kg/cm.

[Physical Characteristics]

In the magnetic recording medium according to the present invention, the surface inherent resistance of the magnetic layer is preferably from $1 \times 10^4$ to $1 \times 10^{12}$ ohm/sq, the elastic modulus thereof is preferably from 100 to 2000 kg/mm$^2$, at 0.2% elongation both in the driving direction and the width direction, the strength at break thereof is preferably from 1 to 30 kg/cm$^2$, the glass transition temperature thereof (the maximum point of the lost elastic modulus measured at 110 Hz) is preferably from 50 to 120° C., and that of the non-magnetic layer is preferably from 0 to 100° C. The lost elastic modulus of the magnetic layer is preferably within the range of from $1 \times 10^7$ to $8 \times 10^7$ Pa, and the lost tangent thereof is preferably not more than 0.2. The lost tangent of not more than 0.2 makes it possible to prevent the magnetic recording medium from being disordered due to adhesion at the time of driving.

The elastic modulus of the magnetic recording medium according to the present invention is preferably from 100 to 1500 kg/mm$^2$, both in the driving direction and the width direction, the residual elongation thereof is preferably not more than 0.5%, thermal shrinkage at all of the temperature region of not more than 100° C. is preferably not more than 1%, more preferably not more than 0.5%, and most preferably not more than 0.1%.

The friction coefficient of magnetic layer of the magnetic recording medium relative to a stainless steel (SUS420J) and that of its opposite surface (base film or back coat layer) are both preferably not more than 0.5, and more preferably not more than 0.3.

The residual solvent contained in the magnetic layer is preferably not more than 100 mg/m$^2$, and more preferably not more than 10 mg/m$^2$. The porosity of the magnetic layer and that of the non-magnetic layer are both preferably not more than 30 volume %, more preferably not more than 20 volume %. Although the porosity is preferred to be small for high output, it is sometimes preferred to secure a prescribed value depending upon the object. For example, in the magnetic recording medium in which repeated application is regarded as important, a large porosity is sometimes preferred in terms of durability.

Depending upon the object, the magnetic recording medium may possess the non-magnetic layer and the magnetic layer each having different physical characteristics. For example, if the elastic modulus of the magnetic layer is increased to enhance the driving durability and the elastic modulus of the non-magnetic layer is lower than that of the magnetic layer, the contact of the magnetic recording medium (the degree of bringing the magnetic recording medium into contact with the head) can be enhanced. In the case where two or more magnetic layers are used, their physical characteristics may be different from each other depending upon the objects. For example, as disclosed in Japanese Patent Laid-Open Publication No. 58-56228, which is incorporated herein by reference, if Hc of the upper magnetic layer is higher than Hc of the lower magnetic layer, the playing output characteristics can be enhanced.

Herein, sizes of various types of powders such as the strongly magnetic metal powder and carbon black (hereinafter simply referred to as "powder size") are determined by a high-resolution transmission electron microscope and an image analysis device. Profile of the powder of the photograph taken by the high-resolution transmission electron microscope can be traced by the image analysis device to determine the powder size. Specifically, the powder size can be defined as follows: (1) In the case where the shape of the powder is a needle, spindle or a column shape (provided that the height is longer than the maximum diameter of the bottom surface) or such, the powder size is expressed by the length of the long axis making up the powder, i.e., as the long axis length; (2) in the case where the shape of the powder is a plate or a column (provided that the thickness or height is smaller than the maximum diameter of the bottom surface) such as the hexagonal ferrite magnetic powder, the powder size is expressed as the maximum long axis length of the plate surface or the bottom surface, i.e., the plate length; and (3) in the case where the shape of the powder is a sphere or polygonal, or an amorphous shape where the long axis cannot be specified, the powder size is expressed as a diameter corresponding to a circle. The term "diameter corresponding to a circle" intended herein is that obtained by a circle projective method.

An average powder size of the powder is an arithmetic mean of the above particle size, and is obtained by measuring the powder size of approximately 500 primary particles as described above. The primary particle means an independent particle without aggregation.

When the powder has a specific shape, for example, in the case of definition (1), the average power size is referred to as the average long axis length, and the arithmetic mean of the value (long axis length/short axis length) is referred to as the average needle ratio.

The short axis length is the maximum length of the axis perpendicular to the long axis length. In the case of definition (2), an average powder size is referred to as the average plate length, and the arithmetic means of (plate length/plate thickness) is referred to as the average plate ratio. Here, the plate thickness means thickness or height. In the case of definition (3), the average powder size is referred to as the average particle size.

Variation coefficient of each data is (standard deviation/average) x 100%.

EXAMPLES

The present invention will now be described in more detail by the working examples. In the components preparations, operations, orders and the like shown herein below can be modified within the scope not deviating from the gist of the present invention, and it should be noted that the present invention is not restricted to the following examples. "Parts" shown in the examples are intended to parts by weight.

[Preparation of Magnetic Recording Medium]

Components for applying liquids for magnetic layers used in Examples and Comparative Examples and methods for producing the same were as follows. An average size of the magnetic power was shown in Tables 1 and 2, and the particle distribution of the magnetic powder particles were adjusted so that the SFD in the lengthwise direction was the value shown in Tables 1 and 2.

1) Examples 1 to 4,9 to 10,11 to 18 23 to 27 and Comparative Examples 1 to 15

| | |
|---|---|
| Strongly Magnetic Metal Powder | 100 parts |
| Composition Ratio (Fe/Co) | |
| Example 1, Comparative Examples 1 and 3 | 90/10 |
| Examples 2-4, and Comparative Examples 4 | 75/25 |
| Coercive Force Hc: 175 kA/m | |
| BET Specific Surface Area: 64 m$^2$/g | |
| Crystalline Size: 11 nm | |
| Ratio of acicular powder: 4.1 | |
| Saturated Magnetized Amount δs: 110A · m$^2$/kg | |
| Anti-sintering Agent: Al, Y | |
| Polyvinyl Chloride Copolymer | 12 parts |
| —SO$_3$Na Content: 1 x 10$^{-4}$ mole/g | |
| Polymerization Degree: 300 | |
| Polyester polyurethane Resin | 3 parts |
| Neopentyl Glycol/Carprolactone Polyol/ | |
| Diphenylmethane Diisocyanate = 0.9/2.6/1 | |
| —SO$_3$Na Content: 1 x 10$^{-4}$ mole/g | |
| α-Alumina (Particle Size: 0.17 μm) | 2 parts |
| Carbon Black (Particle Size: 0.09 μm) | 0.5 parts |
| Butyl Stearate | 1 part |
| Stearic Acid | 5 parts |
| Methylethyl ketone | 90 parts |
| Cyclohexanone | 30 parts |
| Toluene | 60 parts |

2) Examples 5-8 and 19-22

| | |
|---|---|
| Hexagonal ferrite (Ba ferrite) Magnetic Powder | 100 parts |
| Molar composition relative to Ba:Fe 9.10, | |
| Co 0.20, Zn 0.77 | |
| Coercive Force Hc: 183 kA/m | |
| BET Specific Surface Area: 55 m$^2$/g | |
| Saturated Magnetized Amount δs: 58 A · m$^2$/kg | |
| Plate Thickness: 8 nm | |

-continued

| | |
|---|---|
| Polyvinyl Chloride Copolymer | 10 parts |
| —SO$_3$Na Content: 1 × 10$^{-4}$ mole/g | |
| Polymerization Degree: 300 | |
| Polyester polyurethane Resin | 4 parts |
| Neopentyl Glycol/Carprolactone Polyol/ | |
| Diphenylmethane Diisocyanate = 0.9/2.6/1 | |
| —SO$_3$Na Content: 1 × 10$^{-4}$ mole/g | |
| α-Alumina (Particle Size: 0.17 μm) | 8 parts |
| Carbon Black (Particle Size: 0.09 μm) | 1 part |
| Butyl Stearate | 10 parts |
| Butoxy Ethyl Stearate | 5 parts |
| Isohexyldecyl stearate | 3 parts |
| Stearic Acid | 2 parts |
| Methylethyl ketone | 125 parts |
| Cyclohexanone | 125 parts |

The above components were kneaded by a kneader and then dispersed by means of a sand mill. To the resulting dispersion were added 3 parts of polyisocyanate, and then 40 parts of a mixed solvent comprising methyethyl ketone and cyclohexanone were added, and then filtered through a filter having an average pore size of 1 μm to prepare an application liquid for the magnetic layer.

Next, the components and preparation of an application liquid for the non-magnetic layer used in Examples 1 to 7,9 to 20, and 22 to 27, and Comparative Examples 1 to 15 were as follows:

| | |
|---|---|
| Non-magnetic Powder (α-Fe$_2$O$_3$) | 85 parts |
| Average Long Axis Size: 0.15 μm | |
| BET Specific Surface Area: 52 m$^2$/g | |
| pH: 7.6 | |
| Carbon Black | 15 parts |
| Average Primary Particle Size: 16 nm | |
| DBP Oil Absorption Amount: 80 ml/100 g | |
| pH: 8.0 | |
| BET Specific Surface Area: 250 m$^2$/g | |
| Volatiles: 1.5% | |
| Polyvinyl Chloride Copolymer | 12 parts |
| —SO$_3$Na Content: 5 × 10$^{-6}$ mole/g | |
| Polymerization Degree: 280 | |
| Polyester polyurethane Resin | 5 parts |
| Neopentyl Glycol/Carprolactone Polyol/ | |
| Diphenylmethane Diisocyanate = 0.9/2.6/1 | |
| —SO$_3$Na Content: 1 × 10$^{-4}$ mole/g | |
| Butyl Stearate | 1 part |
| Stearic Acid | 1 part |
| Methylethyl ketone | 100 parts |
| Cyclohexanone | 50 parts |
| Toluene | 50 Parts |

The above components were kneaded by a kneader and then dispersed by means of a sand mill. To the resulting dispersion was added 1 part of polyisocyanate, and then 40 parts of a mixed solvent comprising methyethyl ketone and cyclohexanone were added, and then filtered through a filter having an average pore size of 1 μm to prepare an application liquid for the non-magnetic layer.

Next, the components and preparation of an application liquid for the back coat layer used in Examples 1 to 27 and Comparative Examples 1 to 15 were as follows:

| | |
|---|---|
| (1) Mixture A | |
| Carbon Black | 100 Parts |
| BP-800 (available from Cabot) | |
| Nitrocellulose | 100 parts |
| RS1/2 | |
| Polyurethane | 30 parts |
| N2301 (available from Nippon Polyurethane) | |
| Copper Oleate (Dispersant) | 5 parts |
| Copper Phtalocyanine(Dispersant) | 5 parts |
| Subsidence Barium Sulfate(Dispersant) | 5 parts |
| Methylethyl ketone | 500 parts |
| Toluene | 500 Parts |
| (2) Mixture B | |
| Carbon Black | 100 Parts |
| SSA: 8.5 m$^2$/g | |
| Average Particle Size: 270 nm | |
| DBP Oil Absorption Amount: 36 ml/100 g | |
| pH: 10 | |
| Nitrocellulose | 100 parts |
| Polyurethane | 30 parts |
| N2301 (available from Nippon Polyurethane) | |
| Methylethyl Ketone | 300 parts |
| Toluene | 300 parts |

After Mixture A was previously kneaded, Mixture A and Mixture B were dispersed by a sand grinder, and the following components were added based on 100 part of the resulting dispersion:

| | |
|---|---|
| Polyester Resin | 5 parts |
| Bilon 300 (available from Toyobou) | |
| Polyisocyanate | 5 parts |
| Colonate (available from Nippon Polyurethane) | |

Subsequently, the amounts of the application liquids for magnetic layer and the non-magnetic layer were adjusted so that the thickness of the non-magnetic layer after drying was 1.5 μm and further so that the thickness of the magnetic layer at the time of the final product was as shown in Table 1, and they were simultaneously applied on a base film to be double layers. As a base film, polyethylene phtalate having a thickness of 6.5 μm, an average coarseness Ra at the central line (cutoff value: 0.25 mm) of 0.01 μm was used. In Example 8, no non-magnetic layer was provided, and the application liquid for the magnetic layer was directly applied to the base film. The variation in the thickness of the base film in the lengthwise direction was controlled so that the variation in Mrt of the magnetic layer in the lengthwise direction was shown in Table 1.

While the magnetic layer and non-magnetic layer both were still in a wet state, 0.3 T of a rare earth magnet and 0.15 T of solenoid were used for orientation, followed by drying.

On the base film at the side opposite the side on which the magnetic layer had been provided, the application liquid for the back coat was applied so as that the thickness after drying was 0.3 μm, followed by drying.

Furthermore, a calendar comprising 7 stages of rolls all made of metal were used for a treatment at 90° C., and then the resultant sheet was slit into ½ width.

(Method for Writing Servo Signal)

1) Examples 1 to 10 and 24 and Comparative Examples 3 to 6 and 12

Servo band SB1 was uniformly magnetized by a magnetic head in the normal direction of the driving direction of the head, a recording pulse current PC1 for inducing a single direction magnetic flux for magnetization in the reverse direction was imparted to the magnetic head, whereby a servo signal in an LTO Ultrium 2 format was written on the servo band SB1 (Two-way Magnetization 1).

2) Comparative Examples 1 and 2, 7 to 9 and 15

On a servo band having not yet been magnetized, a servo band signal was written (Single-Way Magnetization).

3) Examples 11 to 23 and 25 to 27 and Comparative Examples 10, 11, 13, and 14

The whole of ½ inch wide tape was uniformly magnetized in the normal direction of the driving direction with a permanent magnet so as to generate a prescribed residual magnetism, and then a recording pulse PC1 for inducing a single direction magnetic flux for magnetization in the reverse direction was imparted to the magnetic head, whereby a servo signal in an LTO Ultrium 2 format was written on the servo band SB1 (Two-way Magnetization 2).

[Evaluation Methods]

The resulting magnetic tapes were evaluated according the following evaluation methods. The results are shown in Table 1.

1) Output of Servo Signal

At the time of writing a servo signal through a servo writer, the servo signal was read out from the magnetic tape by the reading head provided on the driving system after the writing head, the output of the read servo signal was measured with an oscilloscope. Output of the servo signal being not less than −2 dB was judged to be excellent output characteristics "E", and output of the servo signal being not more than −2 dB was judged to poor output characteristics "P".

2) Data Error Rate

If the S/N ratio of the servo signal is deteriorated, servo error is frequently generated, deteriorating a servo rate. Excellence and poorness of the S/N ratio of the servo signal was evaluated as the data error rate. A signal having a linear recording density of 80 kbpi was modulated by 8-10 conversion, it was recorded on the magnetic tape in PRI equalization method, and then the data error rate was measured by using a drive for an LTO-2. At this time, when the data error rate was not more than $2.5 \times 10^{-5}$, the S/N ratio of the servo signal was evaluated to be excellent, "E", and when the data error rate was not less than $2.5 \times 10^{-5}$, the S/N ratio of the servo signal was evaluated to be poor "P".

3) Thickness of Magnetic Layer

A strip of the magnetic tape was covered with an epoxy resin, and then cut off in the thickness direction to obtain 0.8 μm-thick test pieces. The cross section of the test piece was observed by TEM (transmission electron microscope) to obtain thickness data.

4) Variation in Mrt

One meter of the magnetic tape was sampled, and then cut off per very 1 cm in the lengthwise direction to obtain test pieces. To each test piece was applied the maximum magnetic field of 796 kA/m (10 kOe) by VDM (vibration sample magnetic force meter) to measure Mrt. From the resulting Mrt, the variation in Mrt of the magnetic layer in the lengthwise direction was calculated.

5) SFD

To a small piece of the magnetic tape was applied the maximum magnetic field of 796 kA/m (10 kOe) to measure a magnetization curve. A differential curve was depicted from the resulting magnetization curve, and SFD was calculated according the equation described above.

6) S/N Ratio of Data Signal

An LTO Ulirum 2 data drive produced by IBM was modified to measure an S/N ratio of the data signal. The recording current was set to the optimal recording current of each tape. A signal having a recording wavelength of 0.3 μm was recorded, and a playing signal was analyzed for frequency by a spectrum analyzer produced by Shibasoku to determine a ratio of the output of the carrier signal (wavelength 0.3 μm) to integrated noise of whole region of the spectrum as an S/N ratio. When an S/N ratio of the data signal was not less than 23 dB, the output characteristics were evaluated to be excellent "E". If it was not more than 23 dB, the output characteristics were evaluated to be poor "P".

The conditions of the magnetic recording medium according to the present invention are as follows:

Basic Conditions 1:
The thickness of said magnetic layer: from 10 to 180 μm; and variation in the product of the residual magnetism by the thickness of the magnetic field: not more than 30%.

Preferred Condition 2:
The magnetic powder is strongly magnetic metal powder having an average long axis length in the range of from 30 to 100 nm or hexagonal ferrite magnetic powder having an average plate length in the range of from 15 to 50 nm.

Preferred Condition 3:
The magnetic layer is preferably provided on said support via a non-magnetic layer at least comprising non-magnetic powder and a binder.

Preferred Condition 4:
SFD is preferably in the range of from 0.10 to 0.70

Preferred Condition 5:
Ratio $R(\phi_0/\phi_1)$ is preferably in the range of from 0.01 to 0.30.

Preferred Condition 5:
The magnetic powder is preferably strongly magnetic metal powder whose variation in the long axis length [(standard deviation of the long axis length)/(average of the long axis length)] is not more than 30%, or hexagonal ferrite magnetic powder whose variation in the plate length [(standard deviation of the plate length)/(average of the plate length)] is not more than 30%.

TABLE 1

| | How to Write Servo Signal | Thickness of Magnetic Layer (nm) | Mrt Variation % | Average Size of Magetic Particle | | Non- Magnetic Layer | SFD | Output of Servo Signal (dB) | | Data Error Rate | |
|---|---|---|---|---|---|---|---|---|---|---|---|
| | | | | Long Axis (nm) | Plate Size (nm) | | | | Ev. | Value | Ev. |
| Example 1 | Two-way Magnetization 1 | 100 | 18 | 45 | — | Presence | 0.55 | −0.5 | E | $6.0 \times 10^{-7}$ | Ev. |
| Example 2 | Two-way Magnetization 1 | 40 | 26 | 45 | — | Presence | 0.49 | −1.7 | E | $1.5 \times 10^{-6}$ | E |
| Example 3 | Two-way Magnetization 1 | 150 | 15 | 45 | — | Presence | 0.56 | 3.5 | E | $9.0 \times 10^{-7}$ | E |
| Example 4 | Two-way Magnetization 1 | 100 | 17 | 90 | — | Presence | 0.43 | 1.2 | E | $1.5 \times 10^{-5}$ | E |
| Example 5 | Two-way Magnetization 1 | 100 | 19 | — | 30 | Presence | 0.38 | −1.6 | E | $3.5 \times 10^{-7}$ | E |
| Example 6 | Two-way Magnetization 1 | 100 | 8 | — | 30 | Presence | 0.3 | −0.8 | E | $3.0 \times 10^{-7}$ | E |
| Example 7 | Two-way Magnetization 1 | 100 | 19 | — | 45 | Presence | 0.28 | −0.5 | E | $9.0 \times 10^{-7}$ | E |
| Example 8 | Two-way Magnetization 1 | 160 | 5 | — | 30 | Absence | 0.31 | 0.2 | E | $1.5 \times 10^{-5}$ | E |
| Example 9 | Two-way Magnetization 1 | 100 | 18 | 110 | — | Presence | 0.55 | −1.0 | E | $1.8 \times 10^{-5}$ | E |
| Example 10 | Two-way Magnetization 1 | 100 | 18 | 45 | — | Presence | 0.74 | −2.0 | E | $2.0 \times 10^{-5}$ | E |
| Comp Ex. 1 | Singl-way Magnetization | 200 | 35 | 90 | — | Presence | 0.45 | 0.0 | E | $8.0 \times 10^{-2}$ | P |
| Comp Ex. 2 | Singl-way Magnetization | 100 | 25 | 45 | — | Presence | 0.74 | −8.0 | P | $3.0 \times 10^{-3}$ | P |
| Comp Ex. 3 | Two-way Magnetization 1 | 25 | 35 | 110 | — | Presence | 0.42 | −2.0 | E | $2.0 \times 10^{-3}$ | P |
| Comp Ex. 4 | Two-way Magnetization 1 | 190 | 21 | 45 | — | Presence | 0.51 | −0.5 | E | $7.0 \times 10^{-5}$ | P |
| Comp Ex. 5 | Two-way Magnetization 1 | 100 | 45 | 45 | — | Presence | 0.55 | −0.9 | E | $2.0 \times 10^{-4}$ | P |
| Comp Ex. 6 | Two-way Magnetization 1 | 200 | 18 | 45 | — | Presence | 0.55 | −0.4 | E | $9.0 \times 10^{-5}$ | P |
| Comp Ex. 7 | Singl-way Magnetization | 100 | 18 | 45 | — | Presence | 0.55 | −4.0 | P | $5.0 \times 10^{-4}$ | P |

As shown in Table 1, Examples 1 to 10, which fulfilled the conditions 1, good values could be obtained in terms of the output of the servo signal and data error rate.

In Examples 1 to 7, possessing a non-magnetic layer provided between the support and the magnetic layer (Condition 3), and having an average powder size of the magnetic particle and an SFD both within preferred ranges, better outputs of the servo signal and better data error rates could be obtained.

On the other hand, Comparative Examples 1 to 7 did not fulfill Conditions 1 of the present invention. In Comparative Example 1, the servo signal is written by a sing-way magnetization, and the thickness of the magnetic layer and the variation in Mrt exceeded the upper limits defined in Conditions 1. Consequently, the data error rate of Comparative Example 1 was worse than those of Examples.

Comparative Example 2 in which the servo signal is written by a sing-way magnetization could not obtain a good S/N ratio of the servo signal and Comparative Example 2, having an SFD value exceeding the upper limit defined in Condition 4 had deteriorated data error rate (P).

Comparative Example 3 whose variation in Mrt and average powder size of the magnetic powder particle exceeded the upper limits defined in Conditions 1 and 2 had a deteriorated data error rate and a poor S/N ratio of the servo signal.

Comparative Example 4 in which the thickness of the magnetic layer exceeded the upper limit defined in Conditions 1 had a deteriorated data error rate.

Comparative Example 5 whose variation in Mrt exceeded the upper limit defined in Conditions 1 had a deteriorated data error rate.

Comparative Example 6 in which the thickness of the magnetic layer exceeded the upper limit defined in Conditions 1 had a deteriorated data error rate.

Comparative Example 7 in which the servo signal is written by a sing-way magnetization could not obtain a good S/N ratio of the servo signal and had deteriorated data error rate.

Although the size of the magnetic powder particle of Example 1 and that of Example 4 were both within the range defined in Conditions 1, since the size of Example 4 was larger than that of Example 1, Example 4 showed a superior output characteristics of the servo signal in comparison with Example 1. Example 8 having no non-magnetic layer had an inferior data error rate in comparison with Example 6, but it was no problematic level.

TABLE 2

| | How to Write Servo Signal | Thickness of Magnetic Layer (nm) | Mrt Variation % | Average Size of Magnetic Layer | | Non- Magnetic Layer | SFD | R Residual Magnetism | Vari. (%) of Magnetic Body | Output of Servo Signal (dB) | | Data Error Rate | | S/N Ratio of Data Signal (dB) | |
|---|---|---|---|---|---|---|---|---|---|---|---|---|---|---|---|
| | | | | Long Axis (nm) | Plate Size (nm) | | | | | | Ev. | Value | Ev. | | Ev. |
| Example 11 | Two-way Magnetization 2 | 100 | 18 | 45 | — | Presence | 0.55 | 0.08 | 17 | −0.5 | E | $6.0 \times 10^{-7}$ | E | 26.0 | E |
| Example 12 | Two-way Magnetization 2 | 40 | 18 | 45 | — | Presence | 0.49 | 0.25 | 18 | −1.2 | E | $1.5 \times 10^{-6}$ | E | 24.5 | E |
| Example 13 | Two-way Magnetization 2 | 150 | 18 | 45 | — | Presence | 0.56 | 0.08 | 17 | 3.5 | E | $9.0 \times 10^{-7}$ | E | 25.8 | E |
| Example 14 | Two-way Magnetization 2 | 100 | 18 | 90 | — | Presence | 0.43 | 0.08 | 16 | 1.2 | E | $1.5 \times 10^{-5}$ | E | 23.9 | E |

TABLE 2-continued

| | How to Write Servo Signal | Thickness of Magnetic Layer (nm) | Mrt Variation % | Average Size of Magnetic Layer | | Non-Magnetic Layer | SFD | R Residual Magnetism | Vari. (%) of Magnetic Body | Output of Servo Signal (dB) | | Data Error Rate | | S/N Ratio of Data Signal (dB) | |
|---|---|---|---|---|---|---|---|---|---|---|---|---|---|---|---|
| | | | | Long Axis (nm) | Plate Size (nm) | | | | | | Ev. | Value | Ev. | | Ev. |
| Example 15 | Two-way Magnetization 2 | 70 | 18 | 45 | — | Presence | 0.56 | 0.04 | 17 | −1.4 | E | $1.0 \times 10^{-6}$ | E | 25.6 | E |
| Example 16 | Two-way Magnetization 2 | 40 | 18 | 45 | — | Presence | 0.55 | 0.08 | 11 | −1.8 | E | $8.0 \times 10^{-7}$ | E | 25.0 | E |
| Example 17 | Two-way Magnetization 2 | 170 | 18 | 45 | — | Presence | 0.55 | 0.25 | 17 | 4.0 | E | $6.0 \times 10^{-6}$ | E | 23.5 | E |
| Example 18 | Two-way Magnetization 2 | 140 | 18 | 30 | — | Presence | 0.55 | 0.08 | 24 | 1.5 | E | $1.0 \times 10^{-6}$ | E | 24.0 | E |
| Example 19 | Two-way Magnetization 2 | 100 | 18 | — | 30 | Presence | 0.38 | 0.09 | 17 | −1.6 | E | $3.5 \times 10^{-7}$ | E | 25.9 | E |
| Example 20 | Two-way Magnetization 2 | 100 | 18 | — | 45 | Presence | 0.28 | 0.25 | 18 | −0.3 | E | $9.0 \times 10^{-7}$ | E | 24.4 | E |
| Example 21 | Two-way Magnetization 2 | 160 | 18 | — | 30 | Absence | 0.31 | 0.09 | 17 | −0.2 | E | $1.5 \times 10^{-5}$ | E | 25.3 | E |
| Example 22 | Two-way Magnetization 2 | 100 | 18 | — | 45 | Presence | 0.38 | 0.09 | 11 | 0.2 | E | $9.0 \times 10^{-7}$ | E | 25.9 | E |
| Example 23 | Two-way Magnetization 2 | 100 | 18 | 45 | — | Presence | 0.74 | 0.08 | 17 | −1.9 | E | $2.0 \times 10^{-5}$ | E | 24.0 | E |
| Example 24 | Two-way Magnetization 1 | 100 | 18 | 45 | — | Presence | 0.55 | 0.01 | 17 | −0.5 | E | $6.0 \times 10^{-7}$ | E | 26.4 | E |
| Example 25 | Two-way Magnetization 2 | 100 | 18 | 45 | — | Presence | 0.55 | 0.45 | 17 | 2.5 | E | $6.0 \times 10^{-6}$ | E | 23.4 | E |
| Example 26 | Two-way Magnetization 2 | 100 | 18 | 45 | — | Presence | 0.55 | 0.08 | 45 | −1.0 | E | $2.0 \times 10^{-5}$ | E | 23.5 | E |
| Example 27 | Two-way Magnetization 2 | 100 | 18 | 45 | — | Presence | 0.55 | 0.45 | 35 | −0.2 | E | $2.0 \times 10^{-5}$ | E | 23.1 | E |
| Comp. Ex. 8 | Single-way Magnetization | 200 | 35 | 90 | — | Presence | 0.45 | 0.08 | 17 | 0.0 | E | $8.0 \times 10^{-2}$ | P | 22.0 | P |
| Comp. Ex. 9 | Single-way Magnetization | 100 | 25 | 45 | — | Presence | 0.74 | 0.08 | 35 | −8.0 | P | $3.0 \times 10^{-3}$ | P | 20.0 | P |
| Comp. Ex. 10 | Two-way Magnetization 2 | 25 | 35 | 110 | — | Presence | 0.42 | 0.08 | 17 | −2.0 | E | $2.0 \times 10^{-3}$ | P | 21.5 | P |
| Comp. Ex. 11 | Two-way Magnetization 2 | 190 | 21 | 45 | — | Presence | 0.51 | 0.08 | 17 | −0.5 | E | $7.0 \times 10^{-5}$ | P | 21.7 | P |
| Comp. Ex. 12 | Two-way Magnetization 1 | 200 | 18 | 45 | — | Presence | 0.55 | 0.01 | 35 | 0.0 | E | $2.0 \times 10^{-4}$ | P | 20.0 | P |
| Comp. Ex. 13 | Two-way Magnetization 2 | 100 | 45 | 45 | — | Presence | 0.55 | 0.08 | 17 | −1.5 | E | $2.0 \times 10^{-4}$ | P | 22.5 | P |
| Comp. Ex. 14 | Two-way Magnetization 2 | 200 | 18 | 45 | — | Presence | 0.55 | 0.08 | 17 | 4.5 | E | $1.0 \times 10^{-5}$ | E | 22.0 | P |
| Comp. Ex. 15 | Single-way Magnetization | 100 | 18 | 45 | — | Presence | 0.55 | 0.08 | 17 | −5.0 | P | $4.0 \times 10^{-4}$ | P | 25.0 | E |

As shown in Table 2, Examples 11 to 27, which fulfilled the conditions 1, good values could be obtained in terms of the output of the servo signal and data error rate.

In Examples 11 to 20 and 22, possessing a non-magnetic layer provided between the support and the magnetic layer (Condition 3), and having an average powder size of the magnetic particle and an SFD both within preferred ranges, better outputs of the servo signal and better data error rate could be obtained.

Example 21 having no non-magnetic layer had an inferior data error rate, but it was no problematic level. Example 21 had a good output of the servo signal and a good S/N ratio of the data signal.

On the other hand, Comparative Examples 8 to 15 did not fulfill Conditions 1 of the present invention. In Comparative Example 8, the servo signal is written by a sing-way magnetization, and the thickness of the magnetic layer and the variation in Mrt exceeded the upper limits defined in Conditions 1. Consequently, no good output of the servo signal could be obtained and, thus, the data error rate and the S/N ratio of the servo signal were worse than those of Examples.

Comparative Example 9 in which the servo signal is written by a sing-way magnetization and whose SFD and variation in the size of the magnetic powder exceeded the upper limits defined in Condition 4 and Condition 6, did not obtain a good output of the servo signal and, thus, the data error rate and the S/N ratio of the data signal were worse than those of Examples.

Comparative Example 10 whose variation in Mrt and average powder size of the magnetic powder particle exceeded the upper limits defined in Conditions 1 and 2 had a deteriorated data error rate and a poor S/N ratio of the data signal.

Comparative Example 11 in which the thickness of the magnetic layer exceeded the upper limit defined in Conditions 1 had a deteriorated data error rate and a poor S/N ratio of the data signal.

Comparative Example 12 whose thickness of the magnetic layer and variation in Mrt exceeded the upper limits defined in Conditions 1 and 6 had a deteriorated data error rate and a poor S/N ratio of the data signal.

Comparative Example 13 whose variation in Mrt exceeded the upper limits defined in Conditions 1 had a deteriorated data error rate and a poor S/N ratio of the data signal.

Comparative Example 14 in which the thickness of the magnetic layer exceeded the upper limit defined in Conditions 1 had a deteriorated data error rate and a poor S/N ratio of the data signal.

Comparative Example 15 in which the servo signal is written by a sing-way magnetization could not obtain good S/N ratio of the servo signal and had deteriorated data error rate. The S/N ratio of the data signal was good.

Although the size of the magnetic powder particle of Example 11 and that of Example 14 were both within the range defined in Condition 2, since the size of Example 14 was larger than that of Example 11, Example 14 showed a superior output characteristics of the servo signal in comparison with Example 11.

The magnetic recording medium according to the present invention can be suitably used as a magnetic recording medium for high-density digital recording medium.

While the present invention has been described by referring to specific embodiments and specific examples, it should be understood that the present invention is not restricted thereto and various modifications and alternations can be made without departing from the scope and spirits of the present invention.

What is claimed is:

1. A magnetic recording medium having a magnetic layer containing magnetic powder provided on a support:
   said magnetic layer possessing a servo band in which a servo signal for controlling tracking of a magnetic head, and a data band on which a data is recorded;
   said servo signal being magnetized and recorded on said servo band, having been magnetized in one direction of the track direction thereof, where said servo signal is in the direction other than said one direction; and
   the thickness of said magnetic layer ranging from 40 to 180 nm and the
   variation of the product of the residual magnetism and the thickness of the magnetic layer being 5-30% acrros the lengthwise direction of the magnetic layer.

2. The magnetic recording medium according to claim 1, wherein said magnetic powder is a magnetic metal powder having an average long axis length in the range of from 30 to 100 nm or hexagonal ferrite magnetic powder having an average plate length in the range of from 15 to 50 nm.

3. The magnetic recording mediuni according to claim 2, wherein said magnetic powder is a magnetic metal powder whose variation in the long axis length is not more than 30%, or a hexagonal ferrite magnetic powder whose variation in the plate length is not more than 30%.

4. The magnetic recording medium according to claim 1, wherein said magnetic layer is provided on said support via a non-magnetic layer at least comprising non-magnetic powder and a binder.

5. The magnetic recording medium according to claim 1, wherein switching field distribution of the magnetic layer, which is a value expressing magnetism reversibility of the magnetic layer, in the track direction is from 0.10 to 0.70.

6. The magnetic recording medium according to claim 1, wherein a ratio $R(\phi_0/\phi_1)$ of the residual magnetism of the portion of the magnetic layer except for the servo band as $\phi_0$ to the residual magnetism $\phi_1$ of portion being applied to an external magnetic field of 1 T is from 0.01 to 0.30.

7. The magnetic recording medium according to claim 1, wherein said servo band is magnetized and written by two-stages comprising a first stage far at least magnetizing the servo signal in the normal direction of the lengthwise direction, and a second stage for imparting the recording pulse current, which induces a singly directed magnetic flux for magnetization in the reverse direction, to a servo signal-recording head to thereby write the servo signal on the servo band.

8. The magnetic recording medium according to claim 7, wherein said magnetization of the servo band in the normal direction in the first stage is performed directly by utilizing a magnetic head.

9. The magnetic recording medium according to claim 7, wherein said magnetization of the servo band in the normal direction in the first stage is performed by magnetizing the whole of the medium in the normal direction of the lengthwise direction utilizing a permanent magnet.

10. The magnetic recording medium according to claim 1, wherein the corrective force of the magnetic layer is from 127 to 356 kA/m.

11. The magnetic recording medium according to claim 1, which further possesses a back coat layer provided on the opposite surface of the magnetic layer.

12. The magnetic recording medium according to claim 11, wherein said back coat layer comprising two types of carbon black each hdving different particle size.

13. The magnetic recording medium according to any of claims 1 to 12, wherein said magnetic recording medium is a magnetic recording tape.

* * * * *